US010077760B2

(12) United States Patent
Tschirch

(10) Patent No.: US 10,077,760 B2
(45) Date of Patent: Sep. 18, 2018

(54) WIND TURBINE WITH TOWER CLIMATISATION SYSTEM USING OUTSIDE AIR

(75) Inventor: Alexander Tschirch, Bremerhaven (DE)

(73) Assignee: AREVA WIND GMBH, Bremerhaven (DE)

( * ) Notice: Subject to any disclaimer, the term of this patent is extended or adjusted under 35 U.S.C. 154(b) by 776 days.

(21) Appl. No.: 14/343,829

(22) PCT Filed: Sep. 6, 2012

(86) PCT No.: PCT/EP2012/067377
§ 371 (c)(1),
(2), (4) Date: Mar. 7, 2014

(87) PCT Pub. No.: WO2013/034627
PCT Pub. Date: Mar. 14, 2013

(65) Prior Publication Data
US 2014/0216680 A1  Aug. 7, 2014

(30) Foreign Application Priority Data
Sep. 9, 2011 (EP) .................................... 11180804

(51) Int. Cl.
*F03D 9/00* (2016.01)
*F03D 80/00* (2016.01)
(Continued)

(52) U.S. Cl.
CPC ................ *F03D 11/00* (2013.01); *F03D 9/00* (2013.01); *F03D 80/60* (2016.05); *F03D 80/00* (2016.05);
(Continued)

(58) Field of Classification Search
CPC ...... F03D 11/00; F03D 80/60; F05B 2240/95; F05B 2250/501; F05B 2260/64
(Continued)

(56) References Cited

U.S. PATENT DOCUMENTS 4,079,262 A * 3/1978 Merkle ...................... F01P 1/02
290/1 B
4,870,832 A * 10/1989 Crawley ................. F24F 7/025
165/47

(Continued)

FOREIGN PATENT DOCUMENTS

CN    201570345 U    9/2010
CN    201714586 U    1/2011
(Continued)

OTHER PUBLICATIONS

Duncan C. Blanchard, "The Vertical Distribution of the Concentration of Sea Salt in the Marine Atmosphere Near Hawaii", Nov. 1, 1983, pp. 1-8.

Primary Examiner — Ljiljana Ciric
(74) Attorney, Agent, or Firm — Davidson, Davidson & Kappel, LLC

(57) ABSTRACT

A wind turbine includes a tower, the tower having an upper part, a middle part and a lower part. The lower and the middle part of the tower form the base of the tower, waste heat generating equipment located in the middle part of the tower, and a cooling device with at least one cooling device inlet formed in the tower for introducing outside air surrounding the tower into the tower. The cooling device is adapted to guide the outside air from each cooling device inlet into the lower part of the tower such that the outside air can ascend towards the middle part and upper part of the tower while cooling the waste heat generating equipment. each cooling device inlet is located in the upper part of the tower.

9 Claims, 2 Drawing Sheets

(51) Int. Cl.
*F03D 80/60* (2016.01)
*F03D 11/00* (2006.01)

(52) U.S. Cl.
CPC ..... *F05B 2240/95* (2013.01); *F05B 2250/501* (2013.01); *F05B 2260/64* (2013.01); *Y02E 10/721* (2013.01)

(58) Field of Classification Search
USPC .......................................................... 290/1 B
See application file for complete search history.

(56) References Cited

U.S. PATENT DOCUMENTS

| | | | | |
|---|---|---|---|---|
| 4,993,348 A * | 2/1991 | Wald | ................ | B63B 1/107 114/256 |
| 6,439,832 B1 | 8/2002 | Siegfriedsen | | |
| 6,936,994 B1 * | 8/2005 | Gimlan | ................ | B60L 8/003 320/101 |
| 6,943,461 B2 * | 9/2005 | Kaploun | ................ | H02K 7/183 290/43 |
| 7,615,884 B2 * | 11/2009 | McMaster | ................ | F03D 9/00 290/44 |
| 7,621,129 B2 * | 11/2009 | DuBois | ................ | F03G 6/045 60/641.1 |
| 7,851,935 B2 * | 12/2010 | Tsao | ................ | F03D 3/00 290/44 |
| 7,870,746 B2 * | 1/2011 | Vandor | ................ | F25J 1/0204 62/271 |
| 7,914,758 B2 * | 3/2011 | Murray | ................ | B01D 53/02 106/704 |
| 7,937,955 B2 * | 5/2011 | Tsao | ................ | F03G 6/068 290/44 |
| 7,938,615 B2 * | 5/2011 | Michaud | ................ | F03D 9/007 415/4.2 |
| 7,958,731 B2 * | 6/2011 | McBride | ................ | F02C 6/16 60/613 |
| 8,051,637 B2 * | 11/2011 | Labrador | ................ | F01K 27/00 60/39.01 |
| 8,102,071 B2 * | 1/2012 | Catlin | ................ | F03B 13/264 290/43 |
| 8,136,354 B2 * | 3/2012 | Havel | ................ | F01K 3/00 60/412 |
| 8,247,915 B2 * | 8/2012 | Crane | ................ | F04B 17/02 290/44 |
| 8,257,019 B2 * | 9/2012 | Cironi | ................ | F03D 1/04 415/126 |
| 8,349,504 B1 * | 1/2013 | Radovich | ................ | C01B 3/32 429/416 |
| 8,482,146 B2 * | 7/2013 | Freda | ................ | F03D 13/20 290/44 |
| 8,482,149 B2 * | 7/2013 | Uphues | ................ | E04H 12/003 290/55 |
| 8,545,701 B2 * | 10/2013 | Kelada | ................ | F03G 7/005 210/321.66 |
| 8,608,249 B2 * | 12/2013 | Vinegar | ................ | E21B 43/243 166/302 |
| 8,616,005 B1 * | 12/2013 | Cousino, Sr. | ................ | F02C 1/002 60/772 |
| 8,621,867 B2 * | 1/2014 | Galbraith | ................ | F03G 6/00 60/517 |
| 8,661,778 B2 * | 3/2014 | Bronicki | ................ | F03G 6/064 60/39.182 |
| 8,664,781 B2 * | 3/2014 | Alvi | ................ | F03D 1/04 290/1 R |
| 8,677,752 B2 * | 3/2014 | Dubois | ................ | F03G 6/045 60/641.2 |
| 8,734,546 B2 * | 5/2014 | McAlister | ................ | F23G 5/02 423/644 |
| 8,826,657 B2 * | 9/2014 | McAlister | ................ | F03G 7/05 60/495 |
| 8,830,658 B2 * | 9/2014 | Eichler | ................ | H05K 7/1432 318/800 |
| 8,875,509 B2 * | 11/2014 | Glezer | ................ | F03G 6/04 290/44 |
| 8,875,511 B2 * | 11/2014 | Simpson | ................ | F24J 3/08 290/44 |
| 8,876,956 B2 * | 11/2014 | Ball | ................ | B01D 53/263 95/117 |
| 8,931,277 B2 * | 1/2015 | Peterson | ................ | C02F 1/22 60/651 |
| 8,937,399 B2 * | 1/2015 | Freda | ................ | F03D 13/20 290/54 |
| 8,938,967 B2 * | 1/2015 | McMaster | ................ | F03D 9/02 290/44 |
| 9,121,389 B2 * | 9/2015 | Baker | ................ | F03D 9/007 |
| 9,347,236 B2 * | 5/2016 | Gawrisch | ................ | F03D 80/00 |
| 9,926,915 B2 * | 3/2018 | Funabashi | ................ | F03D 80/60 |
| 2003/0168864 A1 * | 9/2003 | Heronemus | ................ | B63B 35/44 290/55 |
| 2007/0145748 A1 * | 6/2007 | Pierz | ................ | F03D 9/008 290/43 |
| 2010/0133824 A1 | 6/2010 | Geo | | |
| 2010/0150704 A1 * | 6/2010 | Grevsen | ................ | F03D 80/60 415/177 |
| 2010/0308596 A1 | 12/2010 | Gawrisch et al. | | |
| 2011/0221204 A1 * | 9/2011 | Kim | ................ | F03D 1/00 290/55 |
| 2013/0056989 A1 * | 3/2013 | Sabhapathy | ............ | F03D 11/00 290/55 |
| 2014/0353977 A1 * | 12/2014 | Soerensen | ................ | F03D 9/002 290/55 |

FOREIGN PATENT DOCUMENTS

| | | |
|---|---|---|
| DE | 102008053814 A1 | 2/2010 |
| EP | 1 736 665 A2 | 12/2006 |
| EP | 2589806 A1 | 5/2013 |
| GB | 2 253 478 A | 9/1992 |
| WO | WO 2010/015651 A1 | 2/2010 |
| WO | WO 2010/015674 A2 | 2/2010 |
| WO | WO 2010/051815 | 5/2010 |
| WO | WO 2010/069954 A1 | 6/2010 |
| WO | WO 2010/142263 A2 | 12/2010 |
| WO | WO2011/091863 | 8/2011 |

* cited by examiner

WIND TURBINE WITH TOWER CLIMATISATION SYSTEM USING OUTSIDE AIR

The present invention pertains to a wind turbine comprising a tower, the tower having an upper part, a middle part and a lower part, the lower and the middle part of the tower forming the base of the tower; waste heat generating equipment located in the middle part of the tower, and a cooling device with at least one cooling device inlet formed in the tower for introducing outside air surrounding the tower into the tower, wherein the cooling device is adapted to guide the outside air from the or each cooling device inlet into the lower part of the tower such that the outside air can ascend towards the middle part and upper part of the tower while cooling the waste heat generating equipment.

BACKGROUND

Such a wind turbine is known, for example, from WO 2010/015674 A2. This type of wind turbine, which uses outside air to cool the waste heat generating equipment inside the tower, is not well adapted for certain environments, and in particular environments where the outside air is very humid and/or salty, such as marine environments. In such an environment, the humidity and salt entering the tower as part of the outside air lead to corrosion inside the tower, with the corresponding risk of a breakdown of the wind turbine.

In order to solve this problem, WO 2010/015674 A2 teaches the use of additional filters, heaters, dehumidifiers and the like or even the use of two separate air circuits with a heat exchanger.

However, the solutions taught by WO 2010/015674 A2 are complex, costly and consume a lot of energy.

WO 2010/142263 A2 discloses a wind turbine featuring recirculation of a cooling stream.

EP 1 736 665 A2 discloses a wind turbine tower with a dehumidifier having an inlet and an outlet extending through the tower wall. The inlet and the outlet are used for guiding regeneration air in the form of a regeneration air current through the dehumidifier. Air inside the tower is circulated in the form of a process air current separate from the regeneration air current.

SUMMARY OF THE INVENTION

In the light of the above, an object of the present invention is therefore to provide a wind turbine with a cooling device using outside air, the cooling device being in particular adapted for marine environments while at the same time remaining simple, cheap and low in energy consumption.

This object is achieved by a wind turbine as introduced above, characterized in that the or each cooling device inlet is located in the upper part of the tower.

By arranging the or each inlet for the outside air in the upper part of the tower, the cooling device draws outside air with such a low water and salt content that there is no need for the outside air to undergo complex treatment before it can be used for cooling. Hence, the cooling device of the present invention can do without sophisticated air treatment elements and remains simple.

The wind turbine is based in particular on the insight that, in a typical marine environment, the humidity and salt content of the outside air is not uniform but decreases notably with increasing distance from the sea level. In offshore wind turbines with a typical tower height of around 100 meters, the outside air surrounding the upper part of the tower is sufficiently remote from the sea that it can be used for cooling without prior elaborate treatment, in particular without energy costly de-humidifying.

According to preferred embodiments, the wind turbine of the invention has one or several of the following features, taken in isolation or in all technically possible combinations:
- a waste heat dissipating device, said waste heat dissipating device having a first setting wherein it is adjusted for extracting waste heat from the waste heat generating equipment and for dumping the extracted waste heat into the base of the tower;
- the first setting is a circulation setting, wherein inside air located in the base of the tower is drawn into the waste heat dissipating device, waste heat is transferred to the drawn-in air, and the ensuing heated air is outputted back to the base of the tower;
- the waste heat dissipating device has a second setting wherein it is adjusted for extracting waste heat from the waste heat generating equipment and for dumping the extracted waste heat into the environment surrounding the wind turbine;
- the second setting is a throughput setting wherein air outside the tower is drawn into the waste heat dissipating device, waste heat is transferred to the drawn-in air, and the ensuing heated air is outputted back to the outside;
- the waste heat dissipating device includes:
  a) an intake piece with an inside air inlet and an outside air inlet;
  b) a discharge piece with an inside air outlet and an outside air outlet; and c) a switching device for switching the waste heat dissipating device between:
     i) a circulation setting wherein the inside air inlet is in fluid communication with the inside air outlet; and
     ii) a throughput setting wherein the outside air inlet is in fluid communication with the outside air outlet;
- the switching device is a pair of shutters, with one shutter arranged in the intake piece for selectively shutting either the inside air inlet or the outside air inlet, and the other shutter arranged in the discharge piece for selectively shutting either the inside air outlet or the outside air outlet;
- the waste heat generating equipment includes a transformer, said waste heat dissipating device being adapted for cooling the transformer;
- a sensor assembly for monitoring air parameters, and in particular air temperature and relative air humidity, inside and/or outside the wind turbine tower;
- an air conditioning controller adapted for receiving sensor readings from the sensor assembly and for maintaining air parameters inside the wind turbine tower within a predetermined range by controlling the cooling device and/or the waste heat dissipating device;
- the wind turbine is an offshore wind turbine;
- the upper part of the tower is located above the sea spray zone;
- the lower end of the upper part of the tower is located at least 30 meters above sea or ground level;
- the cooling device has an air treatment unit for treating the outside air, said air treatment unit having a single intake for the outside air and two outlets for the treated outside air, each outlet of the air treatment unit preferably including a controllable fan.

The invention also relates to a method for conditioning the air inside the tower of a wind turbine, said method comprising the following steps:

introducing outside air surrounding the upper part of the tower into the tower; and guiding the introduced outside air into the lower part of the tower such that the introduced outside air can then ascend inside the tower.

Preferably, the wind turbine has waste heat generating equipment located inside its tower, and the method further comprises the step of dissipating the waste heat generated by the waste heat generating equipment by either:

i) transferring said waste heat to the air inside the tower of the wind turbine or ii) dumping said waste heat into the environment surrounding the wind turbine, depending on the current climate inside the tower of the wind turbine.

BRIEF SUMMARY OF THE DRAWINGS

The invention will be better understood when reading the following description of a non limiting example of the invention, with reference to the accompanying figures, wherein.

DETAILED DESCRIPTION

Figure 1:
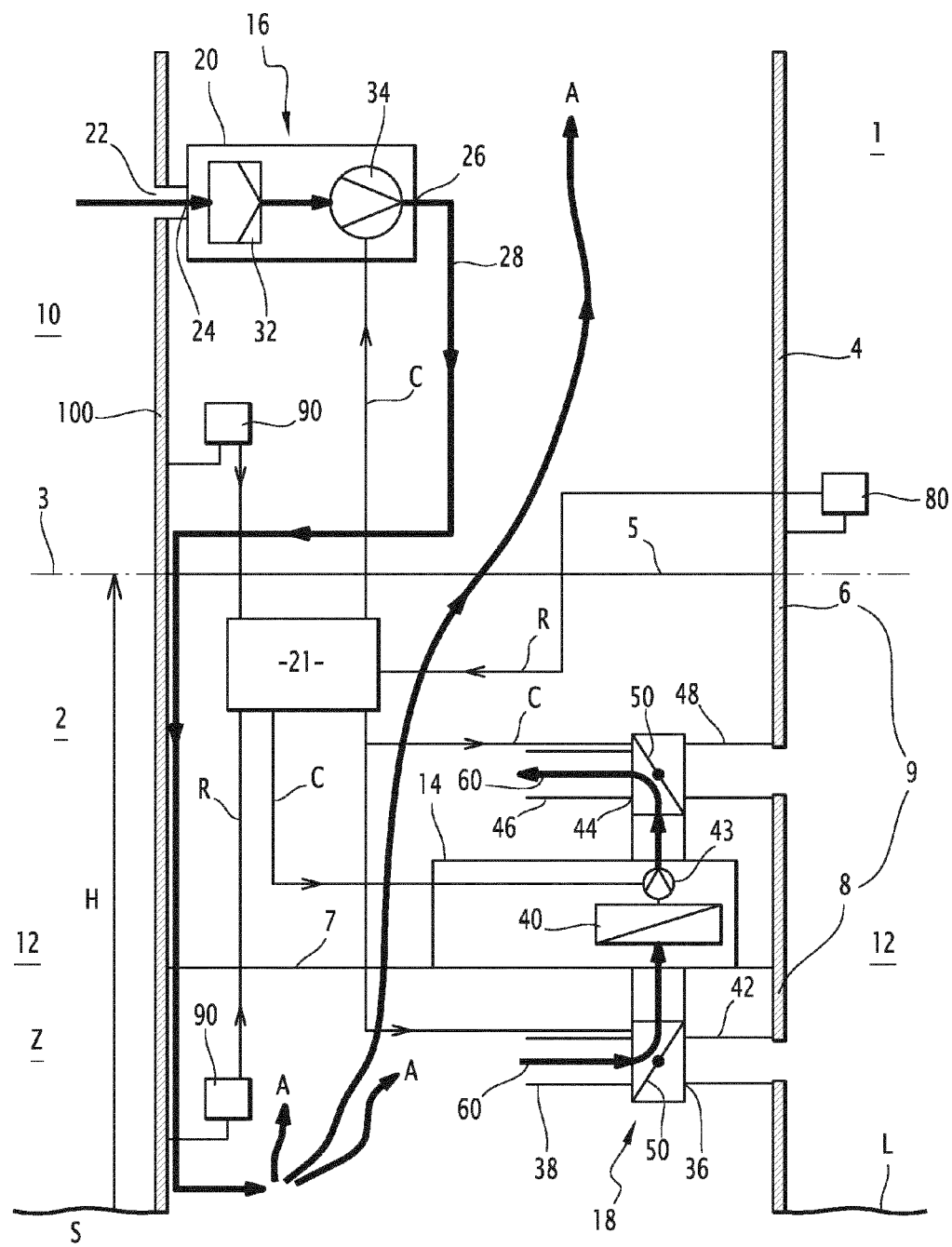
FIG. 1 is a partial longitudinal section through a preferred embodiment of a wind turbine according to the invention in its first operating mode.

With reference to FIG. 1, there is shown a partial longitudinal section of a wind turbine 1.

The wind turbine 1 is located in environment 2, which, in the present embodiment, is a marine environment. Accordingly, the wind turbine 1 shown in the figures is an offshore wind turbine. The sea surrounding the wind turbine 1 is indicated by the reference S. The sea S defines a sea level L. Above the sea level L, there is a sea spray zone Z with an upper end 3 and a height H. Sea spray zone Z not only includes a splash water zone where a wave run up is possible (the splash water zone typically ends 10 meters above sea level L), but extends further up to the height that can be reached by scattered water droplets. Accordingly, sea spray zone Z has a large concentration of scattered water droplets. The typical height H of the sea spray zone Z is of the order of 30 meters above sea level L.

Wind turbine 1 includes waste heat generating equipment 14, such as a transformer.

Wind turbine 1 also has a tower 100, the tower having an upper part 4 with a lower end 5, a middle part 6 and a lower part 8 with an upper end 7. The lower and the middle part 8, 6 of the tower form the base 9 of the tower.

The upper part 4 of the tower is defined as that part of the tower which is located above the sea spray zone Z. Accordingly, the lower end 5 of the upper part 4 of the tower 100 coincides with the upper end 3 of the sea spray zone Z.

The middle part 6 of the tower is defined as that part of the tower which houses the waste heat generating equipment 14.

The lower part 8 of the tower is defined as the part of the tower below the waste heat generating equipment 14.

The upper outside air surrounding the upper part 4 of the tower has the reference number 10. The lower outside air surrounding the base 9 of the tower, which at the same time is the outside air within the sea spray zone Z, has the reference number 12.

The lower outside air 12 has a high salt and water content, whereas the salt and water content of the upper outside air 10 above the sea spray zone Z is substantially lower.

Wind turbine 1 is equipped with a tower climatisation system. The tower climatisation system comprises a cooling device 16, a waste heat dissipating device 18, a sensor assembly 80, 90 and an air conditioning controller 21.

Cooling device 16 includes:

at least one cooling device inlet 22 formed in the upper part 4 of the tower for introducing upper outside air 10 surrounding the tower into the tower;

an air treatment unit 20 for treating the upper outside air 10, said air treatment unit having an intake 24 for the upper outside air and at least one outlet 26 for the treated upper outside air; and an air guiding element 28, such as a piping, for guiding the upper outside air 10 from the cooling device inlet 22 through the air treatment unit 20 into the lower part 8 of the tower 100.

Preferably, the air treatment unit 20 comprises one or more filters 32 and one or more controllable fans 34.

In one embodiment, the air treatment unit 20 has a single intake 24 for the upper outside air 10 and two outlets 26 for the treated upper outside air 10, each of the two outlets 26 of the air treatment unit 20 including a controllable fan 34. In this embodiment, the piping 28 includes two parallel pipes, the two pipes guiding the treated air in two separate air flows from the air treatment unit 20 to the lower part 8 of the tower 100.

The waste heat dissipating device 18 is a cooling apparatus fitted to the transformer 14 in order to cool it. The waste heat dissipating device 18 comprises:

an intake piece 36 with an inside air inlet 38 and an outside air inlet 42; a heat exchanger 40 connected to the intake piece 36;

a conveyor fan 43 connected to the heat exchanger 40;

a discharge piece 44 with an inside air outlet 46 and an outside air outlet 48; and a switching device 50.

Preferably, the switching device is a pair of shutters 50, with one shutter 50 arranged in the intake piece 36 for selectively shutting either the inside air inlet 38 or the outside air inlet 42, and the other shutter 50 arranged in the discharge piece 44 for selectively shutting either the inside air outlet 46 or the outside air outlet 48.

The sensor assembly comprises a first set of air temperature and relative air humidity sensors 90 arranged inside the tower 100, and a second set of air temperature and relative air humidity sensors 80 arranged outside the tower 100, above the sea spray zone Z.

The air conditioning controller 21 is adapted to control the cooling device 16 and the waste heat dissipating device 18 via control connections C and to receive sensor readings from the sensor assembly 80, 90 via read out connections R.

More precisely, the control connections C permit the fans 34, 43 and the switching device 50 to be controlled by the air conditioning controller 21.

The operation of the tower climatisation system will now be described.

Figure 2:
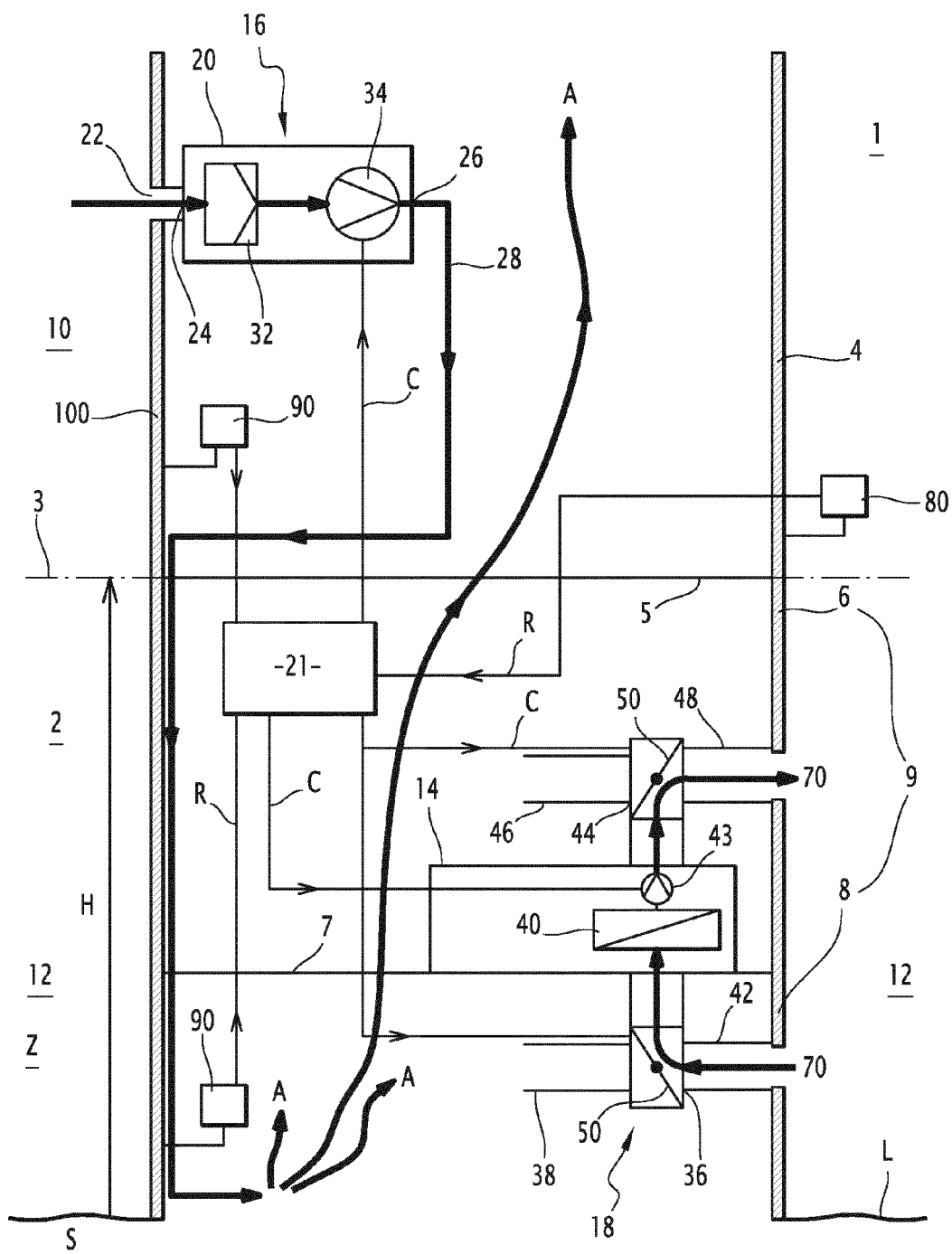
FIG. 2 shows the wind turbine of FIG. 1 in its second operating mode.

The tower climatisation system has two main operating modes, namely a circulation mode and a forced throughput mode. FIG. 1 shows the circulation mode and FIG. 2 the throughput mode. The air conditioning controller 21 switches the tower climatisation system from one mode to the other and controls the tower climatisation system within each mode as a function of the sensor readings coming from the sensor assembly 80, 90 and/or the current power output of the wind turbine. Preferably, the air conditioning controller 21 controls the tower climatisation system such that the relative humidity inside the tower 100 is kept below or equal to 75%. This is because corrosion is inhibited below 75% relative humidity, whereas it increases exponentially above 75% relative humidity.

In both modes, upper outside air 10 is sucked into the upper part 4 of the tower 100 by the fan 34. The fan's 34 suction power is controlled by the air conditioning controller 21 in order to adapt the amount of sucked-in air to the conditions inside the tower as indicated by the sensor assembly 80, 90.

The sucked-in air is then filtered in the air treatment unit 20 and blown into the lower part 8 of the tower 100. As indicated by arrows A, the air then ascends towards the upper part 4 of the tower, while flowing along the waste heat generating equipment 14. The ascending air takes up heat from the waste heat generating equipment, which reduces the air's relative humidity and cools the waste heat generating equipment.

By using upper outside air to cool the waste heat generating equipment 14, the air treatment unit 20 can be kept simple, preferably having only a few passive filters. Indeed, no complex air treatment is needed since the upper outside air 10 is relatively "clean", i.e. relatively free from corrosion inducing salt and water.

Under conditions of low temperature and high relative humidity inside the tower 100 and/or low power output from the wind turbine 1, the air conditioning controller 21 operates the tower climatisation system in the circulation mode. In this mode (cf. FIG. 1), the shutters 50 of the waste heat dissipating device 18 are adjusted such that the inside air inlet 38 is in fluid communication with the inside air outlet 46. Consequently, as indicated by arrows 60, air inside the tower base 9 circulates through the waste heat dissipating device 18. Hence, waste heat from the transformer 14 is dumped into the base 9 of the tower 100. This waste heat is also taken up by the ascending air. In other words, in the circulation mode, the waste heat dissipating device 18 generates a heat buffer in the tower base 9, which heat buffer keeps the relative humidity of the air inside the tower at an acceptable level, thus minimizing the risk of corrosion.

Under conditions of high temperature and low relative humidity inside the tower 100 and/or high power output from the wind turbine 1, the air conditioning controller 21 operates the tower climatisation system in the throughput mode. In this mode (cf. FIG. 2), the shutters 50 of the waste heat dissipating device 18 are adjusted such that the outside air inlet 42 is in fluid communication with the outside air outlet 48. Accordingly, as indicated by arrows 70, lower outside air 12 circulates through the waste heat dissipating device 18. Hence, waste heat from the transformer 14 is dumped into the environment 2 of the tower 100.

Note that the shutters 50 are coupled in a way preventing lower outside air 12 from entering the inside air outlet 46 or the inside air inlet 38. Due to its high salt and water content, lower outside air 12 must not be blown freely into the interior of the tower 100.

The tower climatisation system as described above has the additional advantage of low energy consumption. Indeed, the only energy consuming devices are the fans 34, 43, the sensor assembly 80, 90 and the air conditioning controller 21. Note that the energy consumption of the sensor assembly 80, 90 and the air conditioning controller 21 is almost negligible since these components are low voltage devices.

What is claimed is:

1. A wind turbine comprising:
    a tower, the tower having an upper part, a middle part and a lower part, the lower and the middle part of the tower forming the base of the tower;
    a waste heat generator located in the middle part of the tower;
    a cooler with at least one cooler inlet formed in the tower for introducing outside air surrounding the tower into the tower, the cooler being adapted to guide the outside air from each cooler inlet into the lower part of the tower such that the outside air can ascend towards the middle part and upper part of the tower while cooling the waste heat generator, each cooler inlet being located in the upper part of the tower; and
    a waste heat dissipater, the waste heat dissipater having a first setting wherein the waste heat dissipater is adjusted for extracting waste heat from the waste heat generator and for dumping the extracted waste heat into the base of the tower.

2. The wind turbine as recited in claim 1 wherein the first setting is a circulation setting wherein inside air located in the base of the tower is drawn into the waste heat dissipater, waste heat is transferred to the drawn-in air, and the ensuing heated air is outputted back to the base of the tower.

3. The wind turbine as recited in claim 1 wherein the waste heat dissipater has a second setting wherein the waste heat dissipater is adjusted for extracting waste heat from the waste heat generator and for dumping the extracted waste heat into an environment surrounding the wind turbine.

4. The wind turbine as recited in claim 3 wherein the second setting is a throughput setting wherein air outside the tower is drawn into the waste heat dissipater, waste heat is transferred to the drawn-in air, and the ensuing heated air is output back to the outside.

5. The wind turbine as recited in claim 1 wherein the waste heat dissipater includes:
    an intake piece with an inside air inlet and an outside air inlet;
    a discharge piece with an inside air outlet and an outside air outlet; and
    a switch for switching the waste heat dissipater between:
        i) a circulation setting wherein the inside air inlet is in fluid communication with the inside air outlet; and
        ii) a throughput setting wherein the outside air inlet is in fluid communication with the outside air outlet.

6. The wind turbine as recited in claim 5 wherein the switch is a pair of shutters, one of the shutters being arranged in the intake piece for selectively shutting either the inside air inlet or the outside air inlet, the other of the shutters being arranged in the discharge piece for selectively shutting either the inside air outlet or the outside air outlet.

7. The wind turbine as recited in claim 1 wherein the waste heat generator includes a transformer, the waste heat dissipater being adapted for cooling the transformer.

8. The wind turbine as recited in claim 1 further comprising:
    a sensor assembly for monitoring air parameters at least one of inside and outside the wind turbine tower; and
    an air conditioning controller adapted for receiving sensor readings from the sensor assembly and for maintaining air parameters inside the wind turbine tower within a predetermined range by controlling at least one of the cooler and the waste heat dissipater.

9. The wind turbine as recited in claim 8 wherein the air parameters are air temperature and relative air humidity.

* * * * *